July 21, 1942.  A. MAYER  2,290,288
BATTERY PASTING MACHINE
Filed June 5, 1939   2 Sheets-Sheet 2
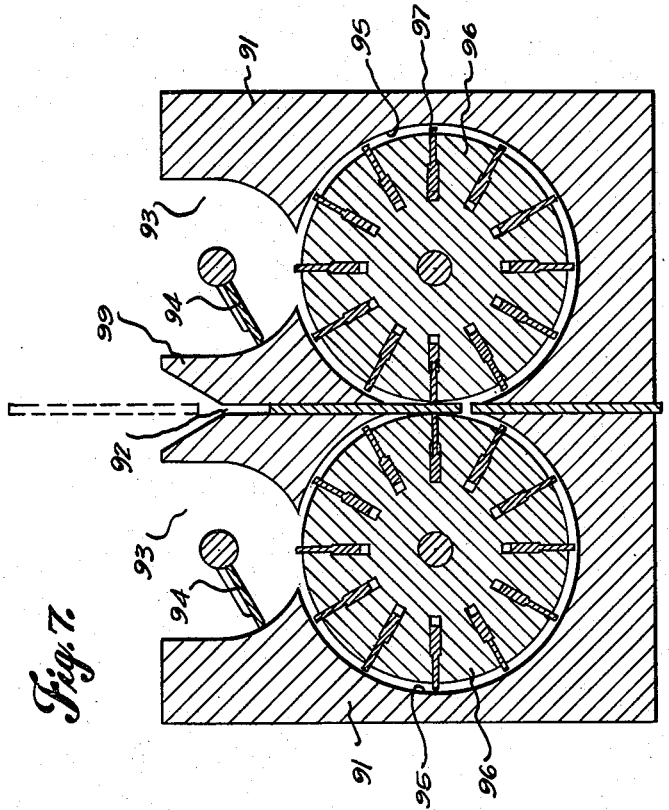
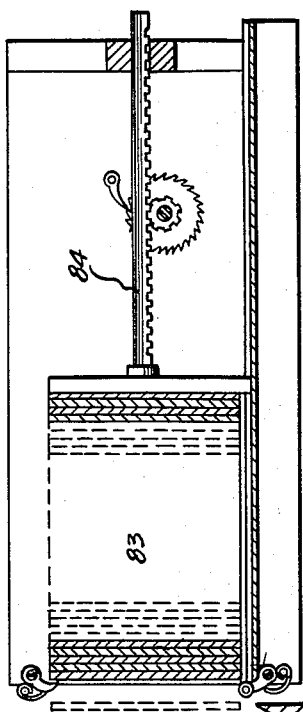
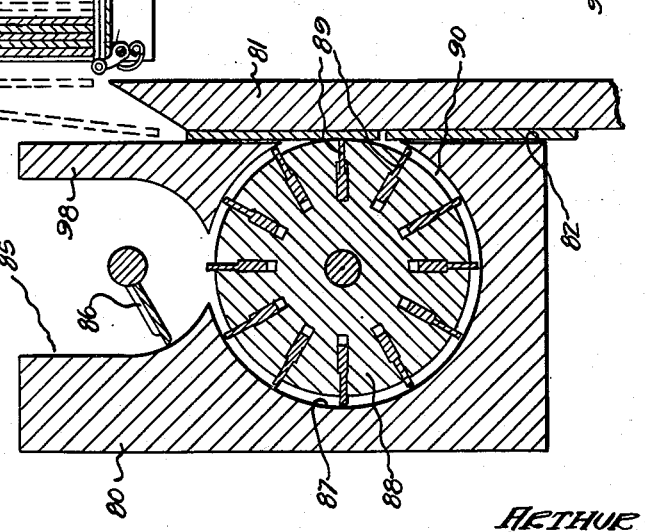
INVENTOR.
ARTHUR MAYER.
BY Samuel Weisman
ATTORNEY.

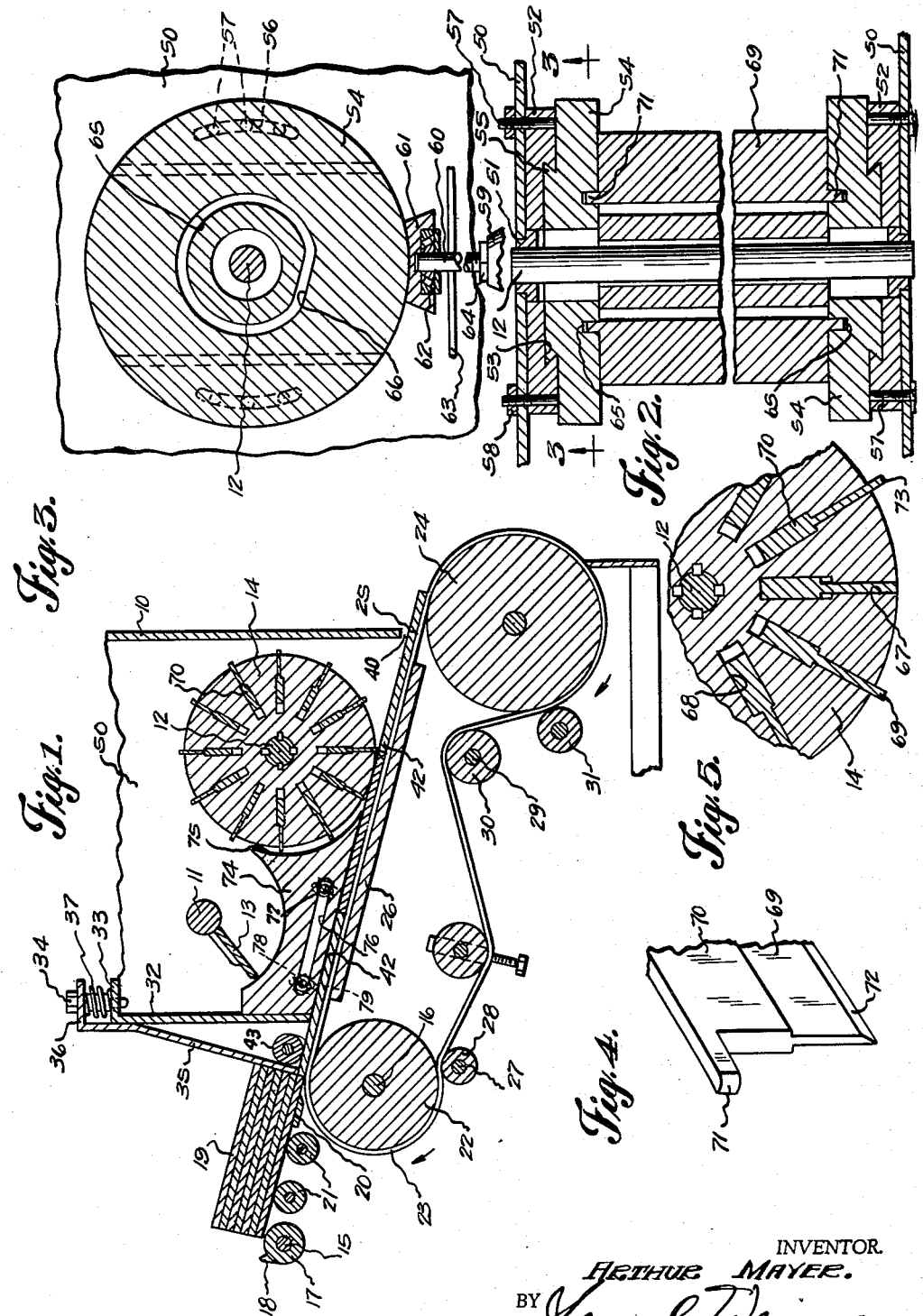

Patented July 21, 1942

2,290,288

UNITED STATES PATENT OFFICE 2,290,288

BATTERY PASTING MACHINE

Arthur Mayer, Detroit, Mich.

Application June 5, 1939, Serial No. 277,382

14 Claims. (Cl. 226—39.6)

The present invention pertains to a novel machine for pasting the grids of storage batteries. The principal object of the invention is to provide a comparatively simple and inexpensive machine of this character wherein the pasting may be more accurately controlled and regulated than hitherto possible.

The paste with which the grids are filled is lead oxide having a heavy consistency. Ordinarily, the paste is agitated in a hopper through which the grid is fed, and the paste is ultimately pressed into the grid by means of a roller. The paste is so heavy that a smooth roller does not necessarily carry any of it by adhesion, or whatever paste is carried by the roller or brought to the grid by gravity is not supplied at a uniform rate. Consequently the pasting is to a large extent uncontrolled. It may vary in any one grid and leave thin spots, on account of which the grid should be rejected. The pasting may also vary among successive grids, resulting in under-pasting or over-pasting, the former resulting in unsatisfactory grids and the latter resulting in operating difficulties well known in the art.

The present invention overcomes these objections by a novel construction which delivers uniform, measured quantities of paste to the grids in a positive manner rather than haphazardly or uncontrolled as stated above. The mechanism consists essentially of radial blades slidably mounted in the pasting roller and adapted to project beyond its circumference. When so projecting, the blades positively pick up and carry paste to the grids in quantities determined by the extent of projection. The measuring is further controlled and made definite by a member spaced from the circumference of the roller and cooperating with the roller and blades to form a measuring chamber. When the blades closely approach the grid, they are withdrawn into the roller to form a continuation of its surface, so that the roller has the usual pressing or packing action on the grids without forming ribs of paste across them. This movement of the blades is accomplished by a cam or guide mechanism with which the blades are associated. As the blades recede from the grid, the cam or guide mechanism again projects them from the surface of the roller between the line of tangency and the position where the blades rise out of contact with the grid.

Suitable means are provided for adjusting the cam or guiding mechanism within the hopper, both vertically and angularly, to regulate the action with respect to the thickness of the grids and the quantity of paste to be delivered thereto. A similar adjustment is provided for the member that cooperates with the pasting roller and blades to form the measuring chamber mentioned above.

The invention is applicable to various grid feeds such as horizontal, sloping or vertical, and also to duplex machines.

The invention is fully disclosed by way of example in the following description and in the accompanying drawings in which:

Figure 1 is a longitudinal section of a machine constructed according to the invention.

Figure 2 is a plan section of the machine, taken through the center of the pasting roller;

Figure 3 is a section on the line 3—3 of Figure 2,

Figure 4 is a detailed perspective view of one of the pasting blades,

Figure 5 is a detailed section of the pasting roller,

Figure 6 is a vertical section of a vertical feed machine, and

Figure 7 is a vertical section of a duplex vertical feed machine.

Reference to these views will now be made by use of like characters which are employed to designate corresponding parts throughout.

In Figure 1 is illustrated the hopper of a battery grid pasting machine, the forward wall thereof being designated by the numeral 10 and broken away. Inasmuch as the hopper is conventional or of any suitable construction, it will be described only to the extent required for a clear understanding of the invention.

In the lateral walls are journaled two transverse shafts 11 and 12, the shaft 12 being slightly below and forward of the shaft 11. These shafts are driven by any suitable means, the shaft 11 preferably being geared as a driver for the shaft 12. The shaft 11 carries an agitator blade 13 within the hopper, and the shaft 12 carries a pasting roller 14, as will presently appear.

Near the rear end of the hopper are journaled two more shafts 15 and 16 also driven by any suitable means and geared together. The shaft 15 carries a roller 17 having a lengthwise dog 18 for feeding battery grids into the hopper. The grids are cast in pairs, with the lugs outward, and are arranged in a column 19 resting on a transverse bar 20 and a pair of idler rollers 21, the bottom grid being engaged and advanced by the dog 18. The shaft 16 carries a belt roller 22, and a belt 23 is trained over this roller and a similar roller 24 beneath the forward end of the hopper. The upper lap 25 of the belt constitutes the bottom of the hopper but rests on and slides over a steel plate 26 comprised in the frame structure of the hopper.

A shaft 27 beneath the shaft 16 carries a roller 28 to hold the belt against the roller 22. A similar shaft 29 is journaled behind the roller 24 and carries a tension roller 30 over which the belt passes. A pressure roller 31 holds the belt against the roller 24.

The rear transverse wall 32 of the hopper has an inward horizontal ledge 33 in which are screwed bolts 34. At the rear side of the wall 32 is an adjustable gate 35 having at its upper edge a flange 36 lying above the flange 33. The bolts 34 pass through the flange 36 and are surrounded by coil springs 37 between the parts 33 and 36 to provide an adjustable and resilient mounting for the gate 35. The opening beneath the lower edge of the gate is such as to permit a single grid from the column 19 to pass therethrough when propelled by the roller 17.

The lower edge of the wall 33 is spaced from the lap 25 to permit passage of a grid as indicated by the numeral 40. Between the gate 35 and the rear hopper wall 32 is a transfer roller 43 adapted to engage and move the entering grid 42.

The side plates 50 of the hopper (Figure 2) carry vertically adjustable bearings 51 for the shaft 12. At the inner surface of each plate 50 is a guide plate 52 having a vertical dovetail groove 53 and supported in a manner presently to be described. At each plate 52 is mounted a cam plate 54 having a tenon 55 received in the corresponding groove 53.

In each of the frame plates 50 are formed at least two arcuate slots 56 having a common center which is approximately the axis of shaft 12 in operative position. A number of bolts 57 are passed through the slots and screwed into the adjacent guide plates 52, and are fitted with nuts 58 bearing against the plates 50. Thus, the guides 52 are capable of a rotary adjustment on loosening the nuts 58, and in such adjustment the cam plates 54 are similarly adjusted.

The cam plates are also adjustable lengthwise of the grooves 53. To effect such adjustment, there is provided beneath each cam plate an internally threaded base 59 resting on the floor and receiving telescopically a vertical screw 60. The upper end of the screw carries a shoe 61 engaging the lower arcuate edge of the corresponding cam plate 54, with a thrust bearing 62 interposed. Through the screw 60 is passed a handle bar 63 for turning the same and thereby adjusting the elevation of the cam plate 54. The adjustment is secured by means of a lock nut 64 on the screw and adapted to engage the top of the socket 59.

The inner face of each cam plate 54 is formed wth a cam groove 65 which is circular except for a comparatively short flat portion 66. This portion lies substantially parallel to the path of the grid through the hopper, for a purpose that will presently be described.

The pasting roller 14 on the shaft 12 lies between the cam plates 54 as shown in Figure 2. The roller is formed with a number of radial slots 67 extending from the circumference and widened or broached at their inner ends, as indicated by the numeral 68 in Figure 5. In each slot is fitted a blade 69 having its inner end widened at 70 to the width of the portion 68 of the slot but of less radial extent than this portion to permit radial sliding of the blade and projection of its outer edge beyond the circumference of the roller, by the means and for a purpose presently to be described.

The inner edge of each blade is prolonged at both ends in the form of lugs 71 received in the opposed cam grooves 65. The latter are so positioned that, when the lugs 71 are received in the circular portion thereof, the outer edges of the blades 69 are projected beyond the circumference of the roller 14. When the lugs are in the flats 66, the outer edges of the blades are substantially flush with the circumferences of the roller 14. These edges may be beveled at 72 to perform a scraping action, or convex at 73 to the circumference of the roller in order to merge therewith. In other words, the blades extend beyond the circumference of the roller except when passing directly over the grid.

At the rear side of the roller, or between the pasting roller and the agitator, a block or abutment 74 is supported in the bottom of the hopper, spaced sufficiently from the belt 25 to permit the grids to pass beneath it. It functions, although not primarily, as a scraper to remove any paste that may have been deposited on the grid surface, so that the grid reaches the pasting roller without any paste deposited on its upper surface.

The forward face of the block 74 is convex at 75 and spaced from and substantially parallel to the circumference of the roller 14.

For adjustment and support, the block 74 has a slot 76 parallel to the lap 25, with bolts 77 passed therethrough and through the hopper sides 50, and nuts 78 on the ends of the bolts. This adjustment by moving the block on the bolts spaces the face 75 from the roller 14. Vertical adjustment for grid thickness is obtained by moving the block 74 with the bolts 77 vertically, which is permitted by slots 79 in the frame sides 50. The latter, being assembled by bolts to the front and rear walls of the hopper, can be loosened before adjustment of the block and then clamped by nuts 78 against the adjusted block 74, and shims can be inserted between the block and the frame sides if necessary.

The space between the face 75 and roller 14 forms a measuring chamber filled with paste by the rotation of the blades 69. Each pair of adjacent blades, when passing along the face 75, moves a fixed quantity of paste to the grid below the roller 14. It will be understood in this connection that the various adjustments of the roller, through the cam plates 54, and the block 74 permit the outer edges of the blades to scrape the surface 75. The blades recede into the roller 14 as they come into contact with the grid, by the action of the flats 66 parallel to the grid. Thus, the measured quantity of paste is first pushed into the grid by the blades and then packed by the roller at the line of tangency.

As the blades cross the line of tangency, they begin to project again from the roller and, in so doing, perform a scraping action on the grid beyond the line of tangency before moving out of contact with the grid. This action may be specifically provided for by increasing the radius of the cam grooves 65 or reducing their pitch at the ends of the flats 66.

The control of the quantity of paste delivered to each grid in the manner described assures uniformity of pasting and prevents over-pasting. It will also be evident that the movement of the projecting blades through the paste, especially in cooperation with the block 74, distributes the oxide uniformly along the roller in advance of the line of contact with the grid, so that the paste is applied uniformly across the latter.

Figure 6 shows a vertical feed type of machine. The body of the machine comprises a block 80 at one side of which is a vertical plate 81 spaced therefrom at 82 to provide a passage for the grids. The grids are delivered from a horizontal stack 83 by suitable or conventional push and release mechanism designated generally by the numeral 84. As such devices are known in the art, further detailed description is not considered necessary.

In the top of the block 80 is formed a cavity 85 constituting a paste hopper and in which an agitator blade 86 is mounted. Below the hopper is a cylindrical cavity 87 in which is rotatively mounted a somewhat smaller pasting drum 88. The drum carries radial blades 89 operating and actuated in the manner described. The space 90 between the circumference of the drum and the wall of the cavity 87 is the measuring chamber corresponding to that adjacent the space 75 in Figure 1.

Figure 7 illustrates a duplex machine of the vertical type which pastes the grids on both sides. This machine comprises two units 91 spaced apart to form a vertical grid passage 92 into which the grids are fed by any suitable means which may be similar to that shown in Figure 6. In the top of each unit is a cavity 93 consisting of a paste hopper and in which is rotatively mounted an agitator blade 94. Below this cavity is a communicating cylindrical cavity 95 in which is rotatively mounted a pasting roller 96. The circumference of the latter is spaced slightly from the wall of the cavity 95 to form the measuring chamber, and the drum carries radial and slidable blades 97 operating and actuated as described in connection with Figures 1 to 5.

In Figures 6 and 7, as in Figure 1, the paste is carried by the projecting blades from the hopper into the measuring chamber from which it is delivered to the grids. As the blades approach the grids they recede into the roller by the action of the cam grooves and thus permit the pasting roller to pack the paste into the grid and smooth it out. The scraping action of the blades described in connection with Figure 1 is also applicable to Figures 6 and 7. The machines shown in these figures are alike in operation, except that the duplex machine simultaneously pastes both sides of the grid in like manner.

In connection with the movement of the paste by the projecting blades, it is to be understood that lead oxide is so thick that a smooth roller can turn in a mass of it without necessarily carrying any of it along by adhesion. At least, any quantity carried along by the roller is not a fixed quantity, and for this reason it has been very difficult if not impossible to paste grids uniformly and accurately by machine. The device disclosed herein delivers a measured, uniform and regulated quantity of paste to each grid, with the result that uniform and controlled pasting is made possible.

The adjusting mechanism for the guides 52 permits the accommodation of at least a few thicknesses of grids to a given pasting roller as well as regulation of the quantity of paste to be delivered to the grids, especially in connection with an adjustment of the block 74. The action of the blades on the grids may be finely regulated by the angular adjustment of the cam plates 54 around the access of shaft 12 in the manner described. When the grid thickness is such that it cannot be handled by a given roller, this roller is readily removed and replaced by a similar roller of suitable dimensions. It will be understood that the number of blades may vary according to the requirements of the work.

The cam plates associated with Figures 6 and 7, although not illustrated, may be adjusted by similar means, and the measuring chambers regulated by providing the portion 98 in Figure 6 and the portions 99 in Figure 7 as separate members adjusted by means similar to that associated with the blocks 74 in Figure 1.

Although a specific embodiment of the invention has been illustrated and described, it will be understood that various alterations in the details of construction may be made without departing from the scope of the invention, as indicated by the appended claims.

What I claim is:

1. In a pasting machine, a hopper, a roller adapted to engage paste in said hopper, means for feeding grids in a path tangential to said roller, said roller being adapted to engage the grids, blades slidably mounted in said roller and adapted to project beyond the circumference thereof into the paste, and means for withdrawing said blades into said roller at the region of contact with the grids.

2. In a pasting machine, a hopper, a roller adapted to engage paste in said hopper, means for feeding grids in a path tangential to said roller, said roller being adapted to engage the grids, blades slidably mounted in said roller and adapted to project beyond the circumference thereof into the paste, and means for withdrawing said blades into said roller at the region of contact with the grids and to project them into scraping contact with the grids on rotation of the roller away from the line of tangency.

3. In a pasting machine, a hopper, a roller adapted to engage paste in said hopper, means for feeding grids in a path tangential to said roller, said roller being adapted to engage the grids, blades slidably mounted in said roller and adapted to project beyond the circumference thereof into the paste, means for withdrawing said blades into said roller at the region of contact with the grids, and an abutment closely adjacent to said roller at the approach side of the line of tangency and cooperating with the roller to form a measuring chamber having one end communicating with the hopper and the other end disposed at said region of contact.

4. In a pasting machine, a hopper, a roller adapted to engage paste in said hopper, means for feeding grids in a path tangential to said roller, blades slidably mounted in said roller and adapted to project beyond the circumference thereof into the paste, means for withdrawing said blades into said roller at the region of contact with the grids, and an abutment closely adjacent to said roller at the approach side of the line of tangency and cooperating with the roller to form a measuring chamber having one end communicating with the hopper and the other end disposed at said region of contact, said abutment having a surface substantially concentric with said roller and engageable by the projecting blades.

5. In a pasting machine, a hopper, a roller adapted to engage paste in said hopper, means for feeding grids in a path tangential to said roller, said roller being adapted to engage the grids, blades slidably mounted in said roller and adapted to project beyond the circumference thereof into the paste, and means for withdrawing said blades into said roller at the region of contact with the grids and to project them into scraping contact with the grids on rotation of the roller away from the line of tangency, and an abutment closely adjacent to said roller at the approach side of the line of tangency and cooperating with the roller to form a measuring chamber, the entire cylindrical surface of the roller being out of contact with the walls of said hopper.

6. In a pasting machine, a hopper, a roller adapted to engage paste in said hopper, means for feeding grids in a path tangential to said roller, blades slidably mounted in said roller and adapted to project beyond the circumference thereof into the paste, a substantially circular guide concentric with said roller and slidably receiving parts of said blades, said guide having a comparatively flat portion substantially parallel to said path for withdrawing said blades into said roller at the region of contact with the grids, and means for adjusting said guide relatively to said path.

7. In a pasting machine, a hopper, a roller adapted to engage paste in said hopper, means for feeding grids in a path tangential to said roller, blades slidably mounted in said roller and adapted to project beyond the circumference thereof into the paste, a substantially circular guide concentric with said roller and slidably receiving parts of said blades, said guide having a comparatively flat portion substantially parallel to said path for withdrawing said blades into said roller at the region of contact with the grids, and means for adjusting said guide in its distance from said path and around the axis of said roller.

8. In a pasting machine, a hopper, a roller adapted to engage paste in said hopper, means for feeding grids in a path tangential to said roller, said roller being adapted to engage the grids, blades slidably mounted in said roller and adapted to project beyond the circumference thereof into the paste, means for withdrawing said blades into said roller at the region of contact with the grids, an abutment closely adjacent to said roller at the approach side of the line of tangency and positioned to engage grids moving in said path, said abutment cooperating with the roller to form a measuring chamber terminating at said region of contact, and means for adjusting said roller and said abutment relatively to said path.

9. In a pasting machine, a hopper, a roller adapted to engage paste in said hopper, means for feeding grids in a path tangential to said roller, blades slidably mounted in said roller and adapted to project beyond the circumference thereof into the paste, cams for withdrawing said blades into said roller at the region of contact with the grids, an abutment closely adjacent to said roller at the approach side of the line of tangency and cooperating with the roller to form a measuring chamber, means for adjusting said cams in their distance from said path and around the axis of said roller, and means for adjusting said abutment relatively to said roller.

10. In a pasting machine, a hopper, a roller adapted to engage paste in said hopper, means for feeding grids in a path tangential to said roller, blades slidably mounted in said roller and adapted to project beyond the circumference thereof into the paste, means for withdrawing said blades into said roller at the region of contact with the grids, and an abutment closely adjacent to said roller at the approach side of the line of tangency and cooperating with the roller to form a measuring chamber, said abutment forming a wall of the grid path to scrape the grids before reaching the roller.

11. In a pasting machine, a hopper, a roller adapted to engage paste in said hopper, means for feeding grids into contact with said roller in a path tangential to said roller, paste measuring and carrying means slidably mounted in said roller and extending through the circumference of said roller and adapted to deliver measured quantities of paste from said hopper to the grids on the approach side of the line of tangency, whereby the roller presses the grids at the line of tangency, and means for withdrawing the paste measuring and carrying means into said roller at the region of contact with the grids.

12. In a pasting machine, a hopper, a roller in said hopper, means for feeding grids in a path tangential to said roller, said roller being adapted to engage the grids, blades slidably mounted in said roller and adapted to project beyond the circumference thereof and to receive paste therebetween, and means for withdrawing said blades into said roller at the region of contact with the grids.

13. In a pasting machine, a hopper, a roller in said hopper, means for feeding grids in a path tangential to said roller, said roller being adapted to engage the grids, blades slidably mounted in said roller and adapted to project beyond the circumference thereof, means for delivering paste between said blades, and means for withdrawing said blades into said roller at the region of contact with the grids.

14. In a pasting machine, a hopper, a roller in said hopper, a moving support for feeding grids in a path tangential to said roller, said roller being adapted to engage the grids, blades slidably mounted in said roller and adapted to project beyond the circumference thereof and to receive paste therebetween, means for withdrawing said blades into said roller at the region of contact with the grids, and means for rotating said roller so that the grid-engaging portion thereof moves in the same direction as said feeding means, whereby said roller first delivers and then presses the paste into the grids.

ARTHUR MAYER.